May 30, 1944.　　　　P. G. CORIN　　　　2,349,846
HYDRAULICALLY-OPERATED MACHINE TOOL
Filed Oct. 5, 1942　　　　8 Sheets-Sheet 3
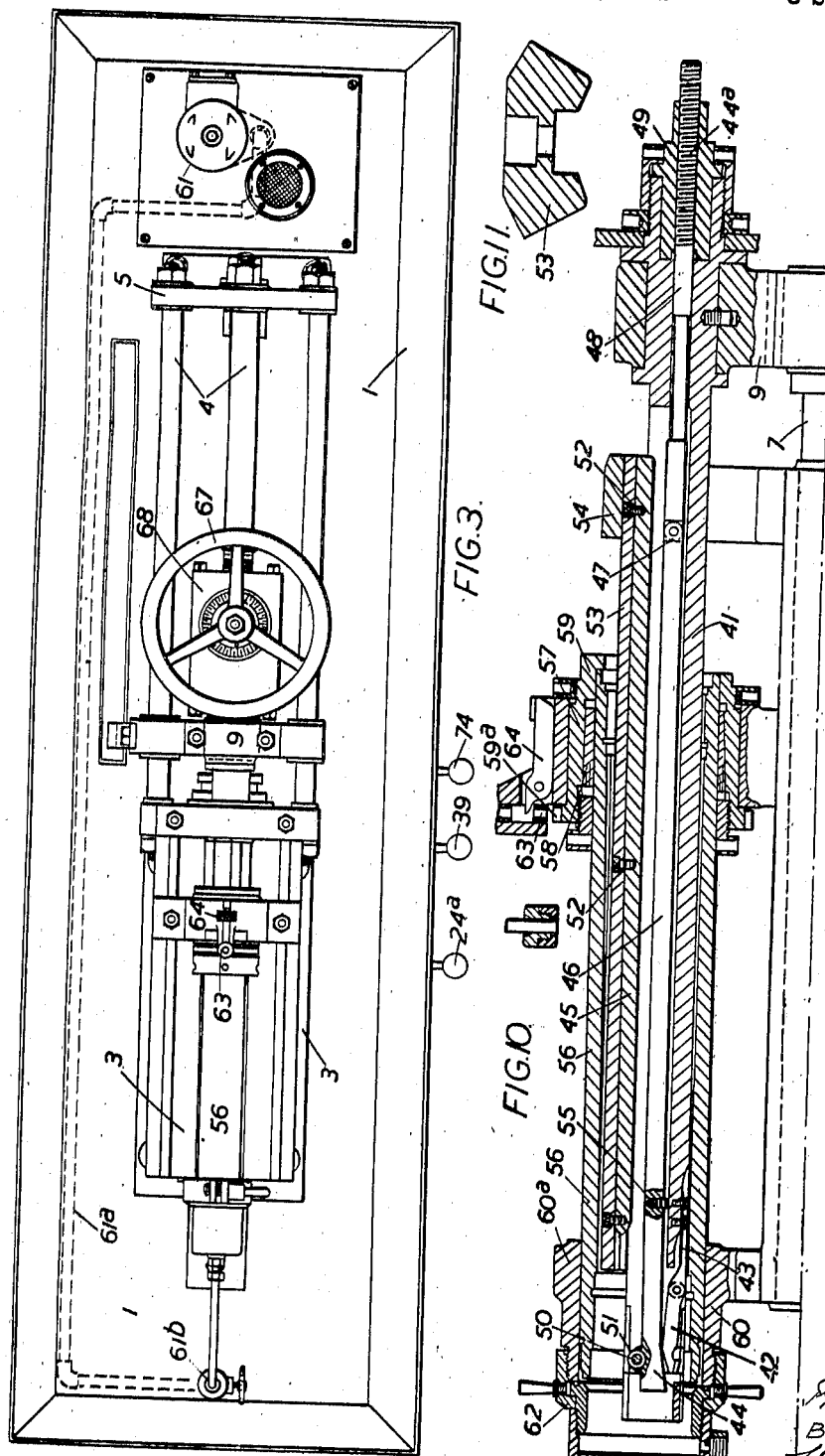
INVENTOR:
Philip G. Corin.
BY
Walter Elmer
ATTORNEY.

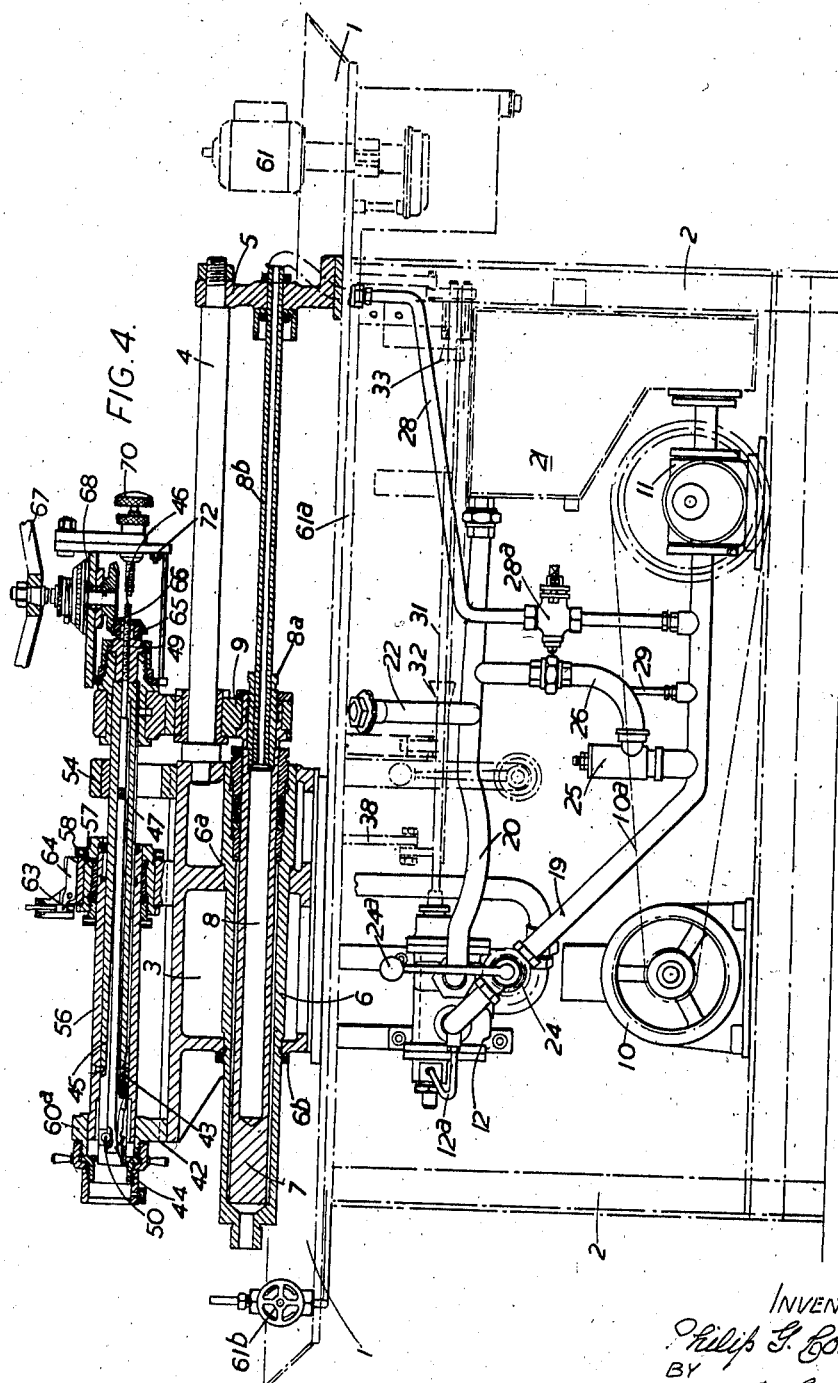

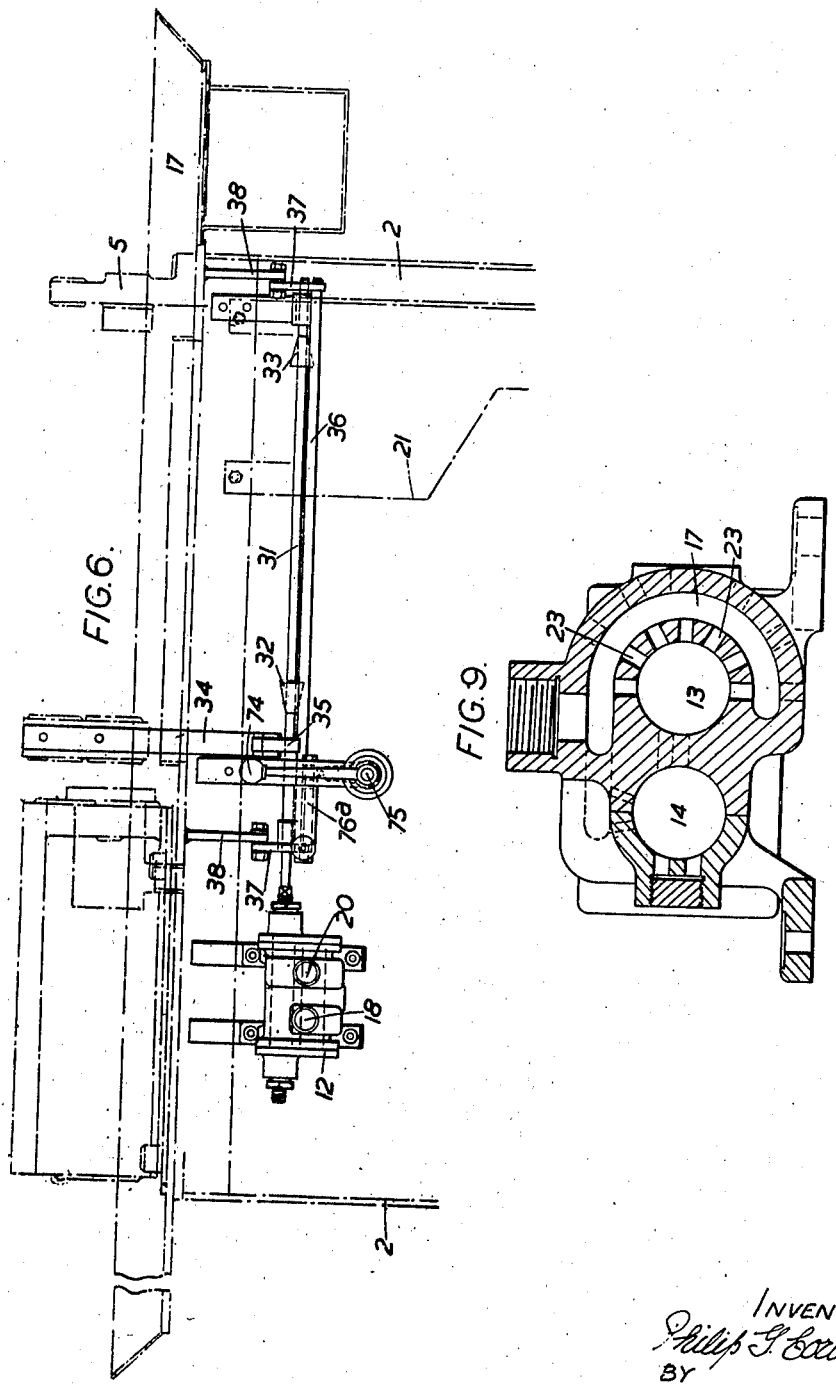

May 30, 1944. P. G. CORIN 2,349,846
HYDRAULICALLY-OPERATED MACHINE TOOL
Filed Oct. 5, 1942 8 Sheets-Sheet 6
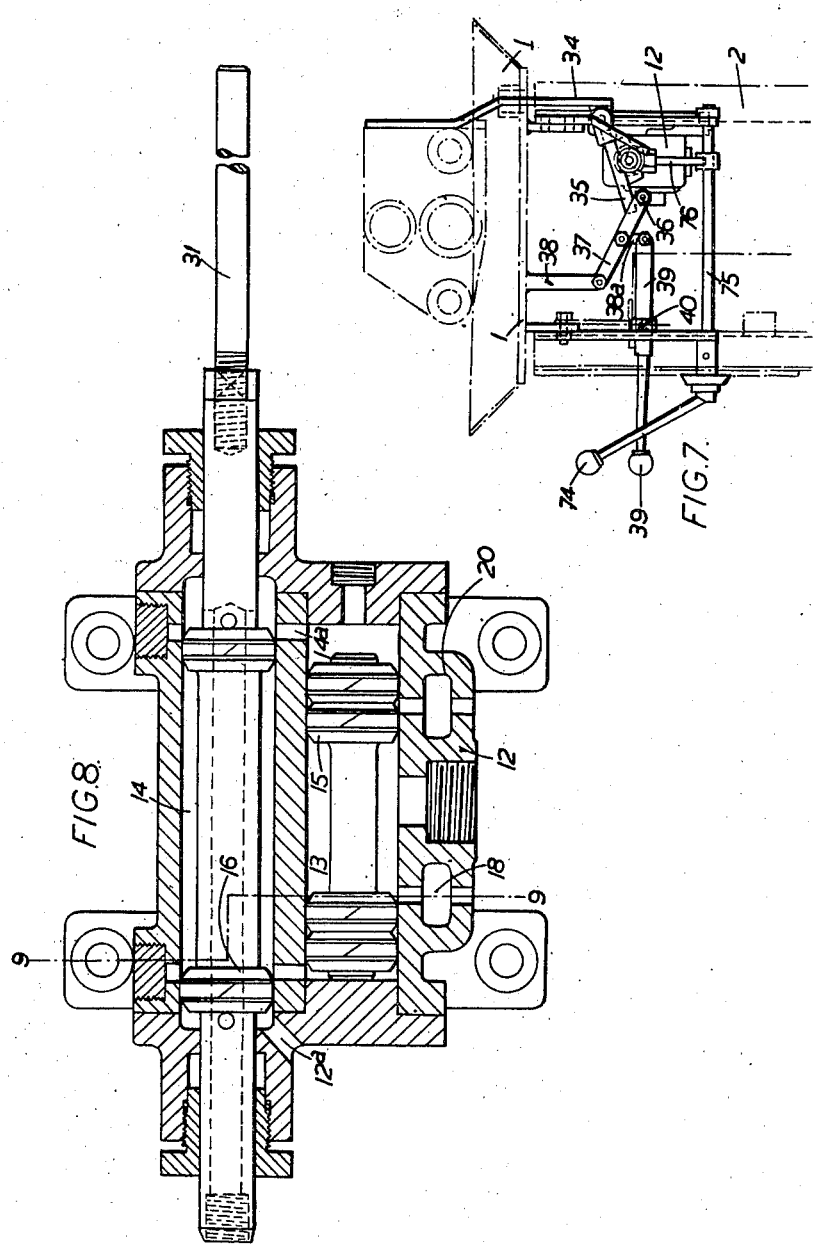
INVENTOR:
Philip G. Corin,
BY
Walter Gunn.
ATTORNEY.

May 30, 1944.  P. G. CORIN  2,349,846
HYDRAULICALLY-OPERATED MACHINE TOOL
Filed Oct. 5, 1942  8 Sheets-Sheet 7

May 30, 1944.  P. G. CORIN  2,349,846
HYDRAULICALLY-OPERATED MACHINE TOOL
Filed Oct. 5, 1942  8 Sheets-Sheet 8

INVENTOR:
Philip G. Corin.
BY Walter Gunn.
ATTORNEY.

Patented May 30, 1944

2,349,846

UNITED STATES PATENT OFFICE 2,349,846

HYDRAULICALLY OPERATED MACHINE TOOL

Philip Grosvenor Corin, Harrogate, England, assignor of one-half to Henry Berry & Company Limited, Leeds, Yorkshire, England Application October 5, 1942, Serial No. 460,778
In Great Britain July 14, 1941

6 Claims. (Cl. 90—28.1)

This invention relates to hydraulically-operated machine tools. It will be described with reference to its incorporation in a machine for cutting internal longitudinal grooves or splines in hollow cylindrical elements (for example, a machine for cutting the tapered splines in the bore of a gun-buffer cylinder) but it is applicable also to other machine tools of a reciprocatory type.

A machine tool according to this invention has a driving cylinder and ram, which are connected respectively to the work and to the tool holder or other reciprocatory work-engaging part of the machine (or vice versa), has a continuous output rotary pump to supply the necessary fluid pressure to the cylinder and ram for driving purposes, and is characterised by a choke valve to regulate the rate of flow of fluid from the pump to the driving cylinder and ram, and by a loaded relief valve to allow the surplus flow from the pump to be by-passed. The arrangement is such that the speed of the driving ram (or cylinder) may be varied by varying the rate of flow of fluid from the pump to the driving cylinder, and the relief valve is set to open at a pressure below that at which the efficiency curve of the drive would begin to fall quickly owing to "slip" in the pump.

The said choke valve may be adapted to be manually operated whenever necessary, and to remain in any set position until moved therefrom manually; or may be arranged for automatic operation at regular intervals, against spring pressure or the like (say at the end of every return stroke of the machine), in which case, locking means will be provided to hold the valve in the re-set position when a change of speed is effected. Alternatively, the choke valve could be adapted for operation automatically at predetermined times, say after a given number of strokes of the machine, or when the tool has been advanced to certain limits, such automatic operation being possible, for example by mechanical means such as a Bowden cable, or link mechanism, or by electrical means such as a contact switch and solenoid.

In the preferred embodiments of the invention, the flow of fluid to the respective ends of the driving cylinder will be controlled by a piston valve in a control cylinder, which valve in turn will be operated by a pilot valve or tappet valve whose movements are effected by contact with a member reciprocating with the driving ram (or cylinder), whereby automatic reversal of the drive is effected at the end of each stroke. Stoppage of the machine is effected by stopping the motor, or by complete closing of the choke valve.

When it is desired that the reciprocating part of the machine (e. g., the tool bar in the example cited) shall have an accelerated return stroke, this may be effected by having different areas of thrust surface to receive the driving fluid for the forward and reverse movements, and/or by having different pressures of fluid at the opposite ends of the driving cylinder. In some cases, the main thrust, for the cutting stroke, may be imparted to the solid outer end of a hollow ram, and the return thrust be imparted to the bottom inner end of the recess in the ram, the pressure for the return thrust preferably being greater than that for the main thrust. Provision may be made for tripping the automatic reversing mechanism at either end of the stroke, so that the tool may be run out, clear of the work, for inspection and other purposes.

According to a further feature of the invention, as applied to the grooving of articles which have an external flange, with a number of recesses therein agreeing with the number and position of the internal splines, means is provided for locating the articles in the work-holding clamps by means of such external recesses, so that a constant relationship obtains between the path of the tool and such recesses. Where there are no such recesses, a sleeve or collar may be clamped on to the cylinder, itself having locating recesses, and this will remain on the cylinder until the machining is finished. By either of these means it is possible, for instance, to rough-machine a set of gun-buffer cylinders or like articles, each in the three or other number of places, with the cutter moving at a higher speed, and then to go through the set again, after changing the cutter, to finish them with the machine working at a lower speed (because of operation of the said choke valve), and the operator can be sure that in every case the cylinder is positioned in the correct angular and longitudinal relationship with the tool path. For articles which do not have external formations which can be used for aligning the internal grooves, clamping and positioning means other than the attached sleeve or collar may be adopted.

The machine may include automatic tool-advancing means, e. g., a ratchet and pawl mechanism, operated at the end of each forward or return stroke, and such means may include an automatic stop mechanism to operate when a predetermined feed has been made. Such a stop mechanism could include an abutment to limit the total feed of the tool, and a collapsible member in the feeding mechanism which would yield after such abutment had been reached, to break the feed connections, and its collapsing movements could also operate a switch in a motor circuit, or other stop means to stop the machine. There may be switch mechanism operated directly by the advancing tool to stop the machine when a predetermined feed has been reached, or such switch mechanism may merely actuate a signalling device to indicate to the operator that the cut is finished.

The invention also comprises a cutter bar of the type having a feed cam to be advanced step-by-step behind a spring-retractable cutter, in which a roller is provided between the feed cam and the copy bar, behind the cutter, in which the feed cam is hinged at a point remote from the cutter, and in which the cutter itself is loosely mounted on its pivot so as to clear itself at the commencement of the return stroke.

Finally, the invention may be characterised by the particular constructional embodiment described below with reference to the accompanying drawings.

In the accompanying drawings, an example of machine according to this invention is illustrated, the machine having been designed for the cutting of tapered longitudinal splines in a gun-buffer cylinder:

Fig. 3 is a plan:

Fig. 4 is a front elevation with the front cover and control panel removed to show the pump, the control cylinder and the associated hydraulic driving means. In this figure the upper parts of the machine, including the cylinder to be grooved, are shown in section:

Fig. 6 is a further but fragmentary front elevation, also with the front cover and control panel removed, but showing the automatic reversing mechanism, and the trip means for running the machine out or in at the end of its normal stroke. The parts are shown run right in, beyond the normal point of reversal.

Fig. 7 is a transverse section through the machine showing the reversing mechanism of Fig. 6 in end elevation:

Fig. 8 is a longitudinal vertical section (to a larger scale) of the hydraulic control cylinder shown in Fig. 6; and Fig. 9 is a transverse section of the same (also to a larger scale) taken on the line 9—9 of Fig. 8.

Fig. 10 is a longitudinal vertical section (to a larger scale) through the cutter bar, the cylinder to be grooved and the hydraulic driving cylinder, the cutter being shown in the innermost position, ready for a cutting movement;

Fig. 11 is a detail section (also to a larger scale) through the copy bar holder hereinafter described:

Figure 1:
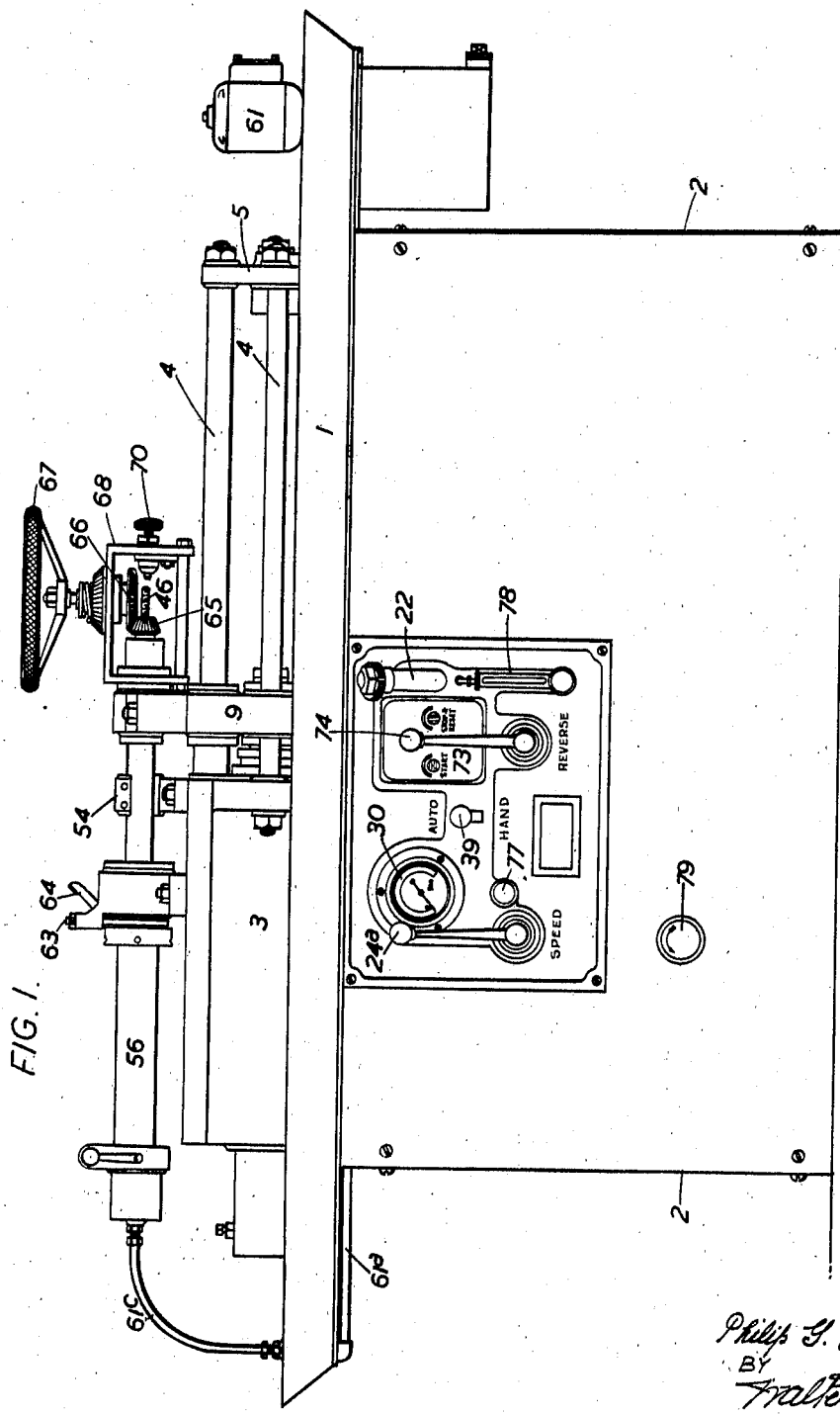
Fig. 1 is a front elevation of the machine with the front cover and control panel in position.
Figure 2:
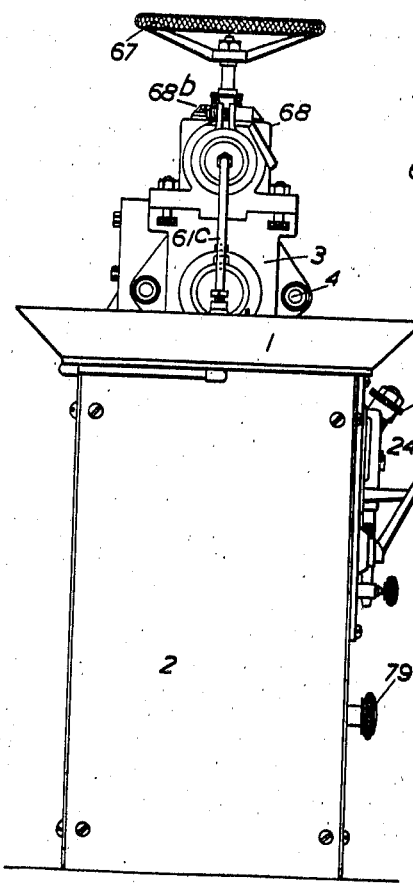
Fig. 2 is an end view of the same.
Figure 5:
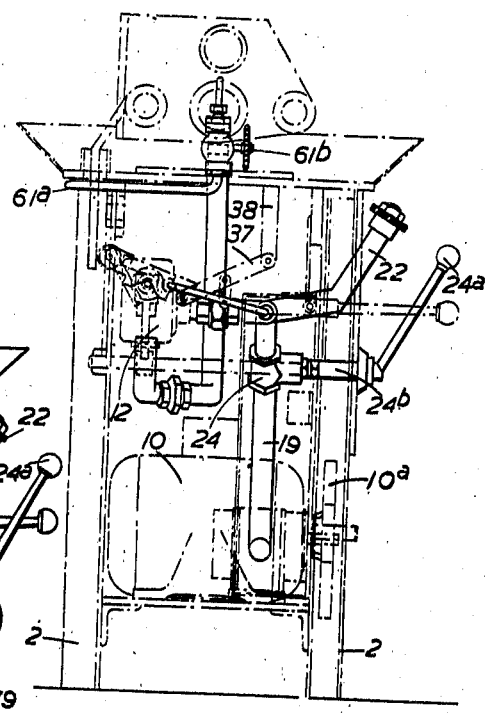
Fig. 5 is a transverse section, also showing the hydraulic driving means.

As shown, more particularly in Figs. 1 to 5, the machine comprises a rigid, metal, trough-like table or stand 1 mounted on suitable supports 2, on which table, near one end, is secured a headstock 3 which, in turn, is braced by stout tie bars 4 to a supporting bracket 5 standing up from the table 1 near its other end. Mounted or formed horizontally in the lower part of the headstock 3 (see Fig. 4) is the driving cylinder 6, secured against axial movement by shoulder 6a and clamping nut 6b, and in such cylinder is the driving ram 7 which has a deep axial recess 8 extending from its outer end. The mouth of this recess has a gland 8a, and slides over a hollow rod 8b extending from the bracket 5. The said outer end of this ram 7 is coupled by means of the bracket 9 to the boring bar hereinafter described in detail, that bar being disposed horizontally above and parallel with the ram 7.

Beneath the table 1 is mounted an electric motor 10 (Fig. 4), driving by means of chain or belt 10a, a continuous-delivery rotary pump 11. Also, beneath the table is mounted a control cylinder 12, which latter (as is shown in greater detail in Fig. 8) has two parallel longitudinal bores 13, 14, the one 13 containing a floating piston or shuttle 15 and the other 14 containing a positively-actuated pilot piston 16. The bore 13 is partly encircled by and communicates with a pair of arcuate passages 17 (see Fig. 9), one of which communicates with an inlet port 18 to which the delivery pipe 19 from the pump 11 is connected, and the other of which communicates with a port to which the exhaust pipe 20 leading to the supply tank 21 is connected. Branching from the exhaust pipe 20; and projecting through the control panel on the front of the machine is the filling nozzle 22. The said passages 17 communicate with the bore 13 by means of the radial holes 23 (see Fig. 9) at a point where such holes are under the control of the shuttle 15, and they also communicate with the bore 14a at a point where they are under the control of the pilot valve 16. The bore 14 also has a constant pressure inlet 12a as shown in Fig. 4, branching from the said delivery pipe 19. The arrangement is such that, in one end position of the pilot valve 16 pressure fluid drives the floating piston 15 to one end of its bore 13 to admit pressure fluid to the driving end of the driving cylinder; and in the other end position of the pilot valve 16, pressure fluid drives the floating piston 15 to the other end of its bore 13 to exhaust the driving end of the driving cylinder. Stoppage of the machine may be effected either by stopping the motor 10, or by means of the choke valve now to be described.

In the feed pipe 19 which leads from the delivery side of the pump 11 to the control cylinder 12, is arranged a choke valve 24 which, on being partly rotated, by means of handle 24a on shaft 24b, reduces the orifice through which the fluid can flow, or substitutes a smaller for a larger orifice, as the case may be, and thereby reduces the rate of flow of such fluid to the cylinder 12. Between such choke valve 24 and the pump 11, branches a spring-loaded relief valve 25, the rear side of which communicates through another conduit 26 with the supply tank 21 from which the pump 11 draws its fluid. The said choke valve 24 is provided with the handle 24a which co-operates with stop means so that it may be thrown between two extreme positions to effect the fast or slow delivery, as desired. Also extending from the delivery pipe 19 is a constant-pressure pipe 28 leading to the outer end of the said hollow rod 8b and supplying the pressure for the return stroke of the ram 7. In this pipe 28 is a further choke valve 28a (which is not accessible through the control panel) by which the rate of flow to the ram 7 may be initially adjusted. The smaller pipe 29 leads to the pressure gauge 30 on the control panel.

When movement of the control valve 24 merely varies the size of the through orifice, as distinct from substituting a larger or smaller orifice, the stop means may be adjustable so as to vary the rates of flow at the two extreme positions. Also there may be separate means, such as a second handle on the valve, or a separate valve, for complete closing of the pipe 19 to stop the machine.

Extending from said pilot valve 16 is a long tappet rod 31, having adjustable stops 32, 33 thereon, whilst depending from the driving ram 7 is a lug 34 carrying a pivotally mounted tappet 35 adapted to engage the respective stop 32 or 33 at the ends of its stroke, to displace the pilot valve 16 in its bore and effect reversal of the driving ram in the manner explained above.

The tappet 35 extends forwardly beyond the tappet rod 31, and overlies a lifting bar 36 carried in links 37 pivotally mounted in the fixed brackets 38 below the table 1, and one of such links is connected by a short member 38a to a handle 39 pivoted at 40 and extending forwardly through the control panel. The depression of the handle 39 causes the lifting bar 36 to raise the tappet clear of the stops 32 and 33, whatever the position of the ram 7 in the cylinder 6, so that the ram 7 will then move to the extreme end of its stroke and remain there. The manual operation of tappet rod 31 is described below. As will be seen in Fig. 6 the ram has has been run right in, the tappet 35 having been lifted over the stop 32. The stops 32 and 33 are backed-off so that tappet 35 will ride over them in one direction.

The boring tool (see Figs. 4 and 10) comprises an elongated tubular carrier member 41, a pivotally-mounted tool 42 at one end, with a spring 43 tending to withdraw the tool from its cutting position, a feed cam 44 behind the tool 42 to advance it to the cutting position against the pressure of the spring 43, screw means 44a at one end of the bar for advancing the feed cam 44 to obtain progressive advancement of the tool 42, and a profile bar 45 governing the feed position of the tool during its reciprocatory motion.

The feed cam 44 is formed on the end of a long bar 46, hinged at 47, remote from the cutter and screwing at 48 into a rotary nut 49. Housed above the feed cam 44 behind the working edge of the cutter, is a roller 50 mounted on pin 51 so as to ride on the copy bar 45, which bar is held by screws 52, in a shaped holder 53 carried by the fixed bracket 54. A compression spring 55 below the bar 46 holds the roller 50 against the copy bar 45.

The gun-buffer cylinder 56 which is to be grooved is housed at one end in a bearing 57 between which and the cylinder is a tapered clamping member 58 in a collet member 59, and is housed at the other end in a bearing 60 having a hinged cap 60a. To this last named bearing and cap is fitted a detachable quick-release coupling 62 for the hose of a coolant circuit the coolant flowing through the cylinder into the trough 1, and to the circulating pump 61. The pump 61 supplies the coolant to the tool through the fixed pipe 61a, adjusting valve 61b, and flexible pipe 61c. A sump for the coolant is shown below the pump 61, complete with filter grid and drain outlet.

Mounted above the bearing 57 is a retractable indexing plunger 63 withdrawable by the lever 64. In Fig. 10, the plunger 63 is shown retracted. The collet member 59 may be clamped on the cylinder by the tapered member 58 before the cylinder is brought to the machine and provides the necessary indexing means for co-operation with the plunger 63, the collet member having recesses 59a to receive the plunger, which recesses are in the same angular relationship as are the splines.

Figure 12:
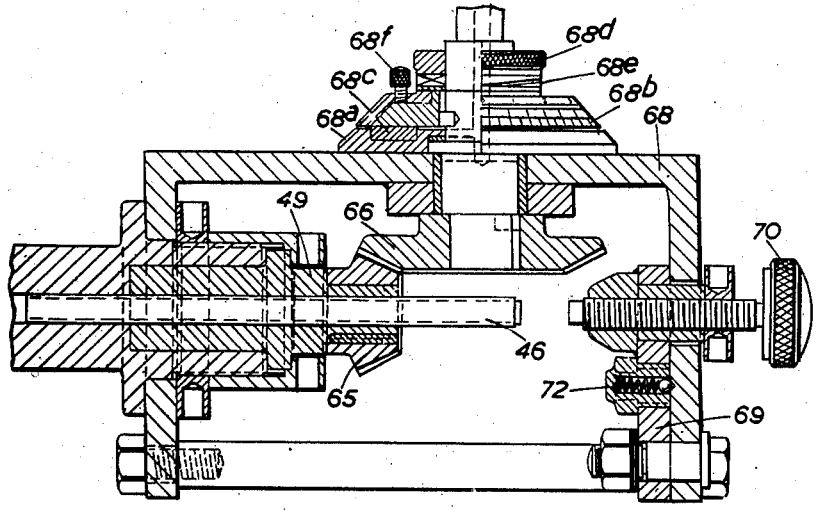
Fig. 12 is a vertical section.
Figure 13:
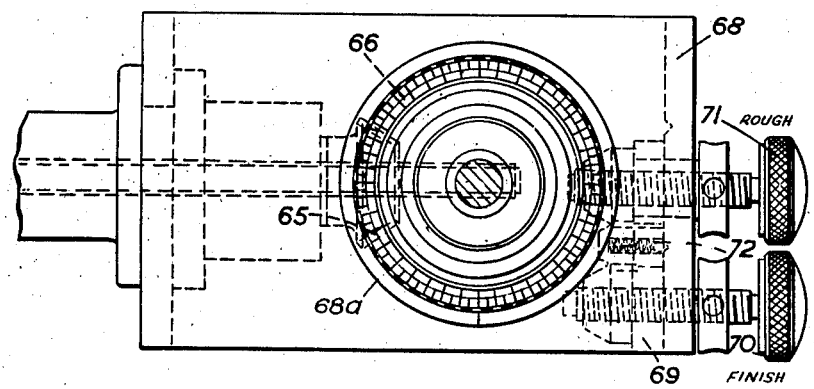
Fig. 13 is a plan of the means shown in Figs. 1 and 2 for advancing and limiting the feed of the cutter.

Referring now to Figs. 12 and 13, the said rotary nut 49 carries a bevel wheel 65 meshing with a further bevel wheel 66 on the axis of a hand wheel 67, this gearing being housed in a box 68. Pivotally mounted on the far side of the box, opposite pinion 65, is a plate 69 carrying two adjustable screws 70, 71, operated by knobs outside the box. By moving the plate 69 about its pivot, either of these screws may be placed opposite the bar 46 to serve as a stop, so that one may be used to limit the rough cut, say at a higher speed, and then the other be used to limit the finishing cut, say at a slower speed. A ball and spring detent device 72 serves to locate the plate 69 in its two positions.

Secured to the top of the box 68 is a bevelled disc 68a, having a single datum or zero line marked across its bevelled face, whilst immediately above such disc, and keyed to the axle of handwheel 67 is a two-part bevelled disc 68b, having a scale engraved on the bevelled face of its outer part. This scale has 31 equally spaced, numbered, larger markings and each representing an advance of .001" in the cutter, and smaller markings each representing an advance of .0005" in the cutter. Between the inner part of the disc 68b and the fixed disc 68a is a ring of friction material 68c, whilst a nut 68d, and spring washer 68e serve to urge the friction surfaces together.

The outer part of the disc 68b bearing the scale is rotatable independently of the inner part, and the two parts may be clamped together by the locking screw 68f. Accordingly it is possible to set the numbered scale to zero with respect to the line on disc 68a, irrespective of the initial position of the handwheel.

The handwheel 67, or a member moving therewith, may be arranged to come into contact with a stop member at the end of each alternate stroke, to obtain an automatic step-by-step feed of the cutter, for example, by a ratchet arrangement, and in such case a friction clutch or other slip device will be adopted, to operate when the bar is obstructed by one of the screws 70, 71.

Figure 14:
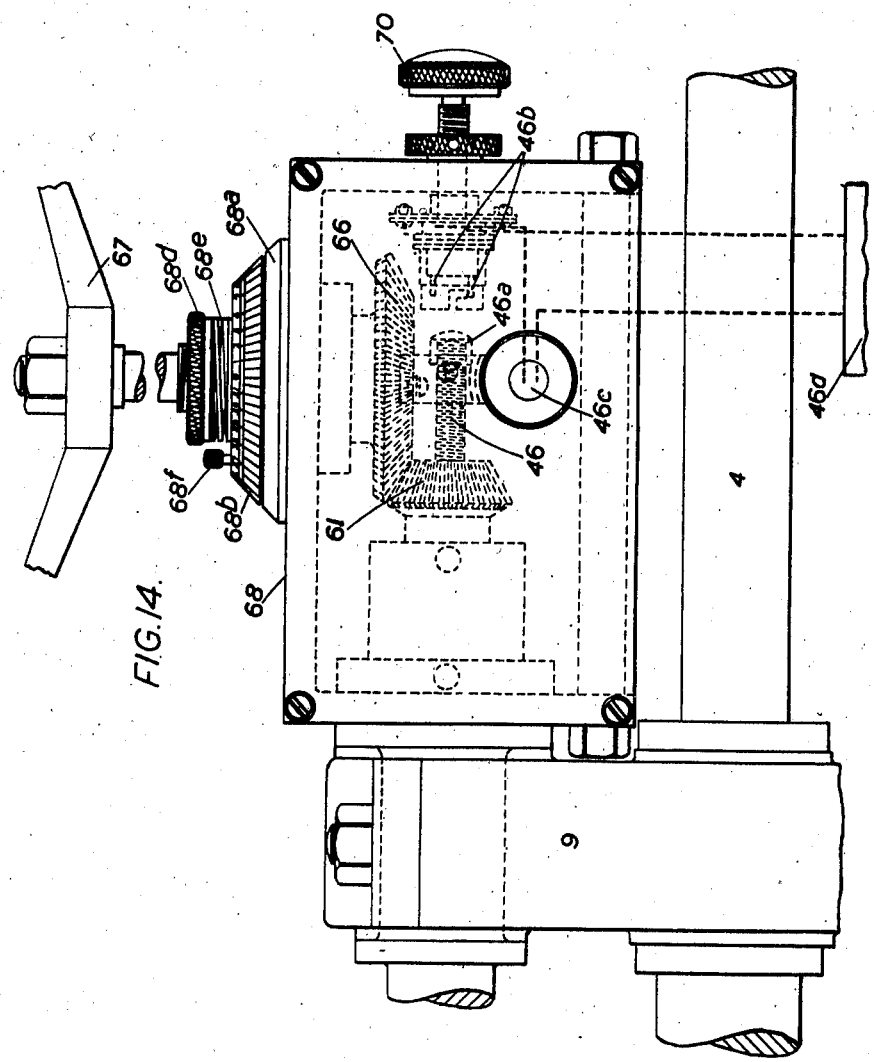
Fig. 14 is a partly-diagrammatic representation of one means of indicating the completion of a cut.

Fig. 14 shows in a partly diagrammatic form, one arrangement of electric signalling device, to warn the operator when the intended depth of cut is reached. As illustrated the rod 46 carries a contact element 46a adapted to bridge the contact pins 46b when the tool has been fed to the limit. The pins 46b are in series with the signal lamp 46c and the secondary of a transformer 46d. There may also be a cut-out device to stop the motor 10 when the contacts 46b are bridged by the element 46a. Whilst in Fig. 14 only one stop is shown for the rod 46, there may be two as in Figs. 12 and 13 and each may have the contacts 46b.

The control panel shown in Fig. 1 comprises the pressure gauge 30, the handle 24a for operating the choke valve 24; the handle 39 for changing over from automatic to-and-fro movement, to a run-out movement in either direction;

a stop-and-start switch 73 for the motor 10; the filling nozzle 22; a lever 74 for manually operating the tappet rod 31 so as to obtain manual reversal of the machine at any time, this lever operating through shaft 75 and radial arm 76 on that shaft, and link 76a, secured to the tappet rod (see Fig. 6); a knob 77 for a regulating cock (not shown) for the pressure gauge; and an oil level gauge 78 to indicate the level of oil in the tank 21. Below the panel is a knob 79 on the motor shaft, for use in "inching" the motor when required. Levers 24a and 74 move in an oscillatory path, whilst lever 39 moves in a vertical path.

In the operation of the machine, the buffer cylinder to be grooved is first placed in position with one end clamped in the collet member 57 by means of packing ring 58, and with its other end held in the bearing 60 by means of the cap 60a. The buffer cylinder is indexed by the plunger 63 falling into one of the recesses in the collet member 57. The quick-release coupling 62 for the coolant fluid is now attached to bearing 60 so as to feed coolant fluid to the interior of the cylinder, and the adjusting valve 61b is opened, if not already open. The cutter 42 and the stops 70 and 71 having been set, the copy bar having previously been secured in position, and the outer part of the disc 68b having been brought to the zero position and locked by means of screw 68f, the machine is ready for use.

Assuming control valve 24 to be closed, and the cutter bar (and ram 7) having been run in to the extreme inner position, the motor 10 is now started by means of the push-button switch 73, whereupon the driving fluid commences to circulate through the pump 11, conduits 19, the relief valve 25, by-pass 26 and tank 21. At the same time, pressure fluid is fed to the interior of the ram 7 via pipe 28 and valve 28a, which tends to keep the ram (and cutter bar) at the innermost position, the driving cylinder 6 being open to exhaust through the control cylinder 12. The valve 24 is now moved over to the open position, for "fast" operation, whereupon the driving fluid is fed forward to the control cylinder 12, which, however, is still exhausted by valve 15. The operator now moves lever 74 to displace the tappet rod 31 and pilot valve 16, which results in the shuttle valve 15 being displaced by admitting fluid to open the driving cylinder 6 to the pressure fluid, the result being that the ram 7 and with it the cutter bar, is advanced out of cylinder 6 and at the higher speed, the tool 42 during this movement, cutting the inner wall of the buffer cylinder under the influence of the copy bar 45. The tappet 35 rides over stop 32 and falls on to the tappet rod 31 between the two stops. As the parts reach the end of the outward stroke, the depending tappet 35 meets the stop 32 on the tappet rod 31 and thereby displaces that rod and the pilot valve 16, which immediately results in displacement of the shuttle valve 15 to the other end of its bore and exhausts the driving cylinder 6. As there is a constant supply of pressure fluid from the pump to the interior of the hollow ram 7, through pipe 28 and valve 28a, the exhausting of the driving cylinder 6 results in the ram 7 being returned into the driving cylinder, and the cutter bar thereby returned into the work. This return movement continues until tappet 35 meets stop 32 on the tappet rod 31, thereby returning the pilot valve 16 to its original position and reversing the position of the shuttle valve 15, so as again to feed the driving cylinder and repeat the cycle of operations. This repetition is continued, the operator advancing the tool by means of handwheel 67 at the end of each return stroke, until the outer end of the feed bar 46 meets the stop 70, after which no further feed can be effected. The operator now moves the handle 24a to reduce the rate of flow through the choke valve 24 and also displaces plate 69, so as to bring stop 71 into line with the feed bar in place of stop 70. Thereafter, the advancing of the tool by means of handwheel 67 is done more carefully and in smaller increments to give a finishing cut, the machine now running at a slower speed. Alternatively, all the splines in a cylinder or even in a number of cylinders could be rough cut before stops 70 and 71 are reversed, and if necessary a change of tool may be made before giving the finishing cut.

When feed bar 46 meets stop 71, or if at any intermediate time the operator wishes to examine the work, the control lever 39 is depressed, so as to lift the relieving bar 36 and bring the tappet 35 out of the path of the stop 32, the result being that the ram 7 is forced as far out of its cylinder 6 as possible, thereby bringing the cutter bar completely out of the work. Similarly, the cutter bar may be run right into the work, as in Fig. 4. It will be noted that the coolant fluid is so fed that it naturally washes the cuttings out of the work.

By suitable manipulation of the control lever 24a so as to vary the rate of flow of pressure fluid to the driving cylinder 6, the speed of the machine may be varied as desired, from a mere crawl to the maximum possible and, in fact, the machine can usually be stalled anywhere, if necessary. At all times, surplus fluid from the pump (which is a continuous-delivery pump) is by-passed through the relief valve 25, such valve, as above stated, being so loaded as to open just before slip in the pump would cause an undue fall in efficiency.

The formation of the control cylinder 12 with the arcuate passages 17 and the plurality of openings between these passages and the bore 13 allows of rapid exhausting and supplying of the bore 13, whilst giving adequate support to the valve 15, and as a result almost instantaneous reversal of the ram 7 is obtainable, regardless of the speed at which the machine is working.

When one spline in the buffer cylinder is finished and another is to be begun, the lever 64 is depressed to withdraw plunger 63 from the collet member 57, whereupon the cylinder is rotated until such plunger 63 falls into another recess in the collet member, after which the cutting operation is repeated for the second spline. The machine may, of course, be stopped at any time by means of the switch 73. The pump 61 for the coolant fluid is driven by its own motor, independently of the main drive.

What I claim is:

1. A hydraulically-operated machine tool having a driving cylinder and ram for creating motion between the tool and the work, there being a smaller area of thrust surface for the return stroke than for the working stroke; having a continuous output uni-directional pump to supply the necessary fluid pressure to both ends of the cylinder for the drive, the supply to the return end of the cylinder being uninterrupted; having valve means for interrupting the fluid pressure to the working end of the driving cylinder and for exhausting that end of the cylinder only when the pressure supply is cut off; having a choke valve to regulate the rate of flow of pressure fluid to the said interrupting devices and to the working end of the driving cylinder; and having a loaded relief valve placed so as to allow surplus fluid from the pump to by-pass the interrupter valve means and the choke valve, and to allow fluid from the return end of the cylinder to escape without passing through the pump.

2. A hydraulically-operated machine tool having a driving cylinder and ram for creating motion between the tool and the work, having a continuous-output pump to supply the necessary fluid pressure for the drive, having a choke valve to regulate the rate of flow of fluid from the pump to the driving cylinder and ram, and having a loaded relief valve to allow the surplus fluid from the pump to be by-passed, and wherein the flow of fluid to the respective ends of the driving cylinder is controlled by a shuttle piston valve in a control cylinder, which valve in turn is operated by a pilot valve connected with a tappet rod and controlled by the reciprocating parts of the machine, with means for releasing the tappet rod from the reciprocating parts when desired.

3. A hydraulically-operated machine tool according to claim 1, wherein the choke valve is adapted to be manually operated whenever necessary, and to remain in any set position until moved therefrom manually, and having automatic tool-advancing means operated at the end of each alternate stroke, with stop means to limit the total advance, and a yieldable or collapsible mechanism in the tool-advancing means to give way when the stop means is reached.

4. A hydraulically-operated machine tool comprising a trough-like table, a headstock thereon, a driving cylinder and ram in the headstock, a control valve below the headstock with a tappet rod extending therefrom, means on the ram for engaging the tappets for automatic operation of the control valve, a motor below the table driving a continuous-delivery rotary pump, means for supplying pressure fluid to the larger end of the ram through the control valve, and to the smaller end of the ram directly, and a choke valve in such means to regulate the rate of flow of fluid to the said larger end, with a spring-loaded relief valve to by-pass the surplus fluid delivered by the pump, such relief valve being set to open just before the efficiency curve would begin to drop due to "slip" in the pump.

5. A machine according to claim 2, wherein the hydraulic driving means comprises a continuous-delivery rotary pump, a choke valve to vary the rate of flow of fluid from the pump to the driving cylinder, and a loaded relief valve to by-pass any surplus fluid delivered by the pump.

6. In a hydraulically-driven machine tool according to claim 2, a control cylinder having parallel bores for the said shuttle piston valve and pilot valve respectively, arcuate exhaust and delivery passages encircling the bore for the shuttle valve and extending alongside the bore for the pilot valve, and a series of radially-disposed through openings between the arcuate passages and the bore it encircles, with further openings between them and the other bore.

PHILIP GROSVENOR CORIN.